United States Patent [19]

Herklotz et al.

[11] 4,432,062

[45] Feb. 14, 1984

[54] METHOD FOR OPTIMIZING THE KNOCK FREQUENCY OF AN ELECTROFILTER SYSTEM

[75] Inventors: Helmut Herklotz, Neu Isenburg; Günter Mehler, Frankfurt am Main; Franz Neulinger, Dietzenbach; Helmut Schummer, Heusenstamm; Horst Daar, Erlangen; Walter Schmidt, Uttenreuth; Heinrich Winkler, Neunkirchen, all of Fed. Rep. of Germany

[73] Assignee: Siemens Aktiengesellschaft, Munich, Fed. Rep. of Germany

[21] Appl. No.: 226,353

[22] Filed: Jan. 19, 1981

[30] Foreign Application Priority Data

Jan. 17, 1980 [DE] Fed. Rep. of Germany ....... 3001595

[51] Int. Cl.[3] ......................... G06F 15/46; B03C 3/76

[52] U.S. Cl. ...................................... 364/500; 55/112; 364/153

[58] Field of Search ......... 364/131, 132, 148, 152–156, 364/400, 413, 418, 496, 497, 500, 502, 505, 506, 572, 575, 508; 55/96, 97, 101, 106, 108, 112, 271–274, 283, 284, 293, 300, 304, DIG. 34

[56] References Cited

U.S. PATENT DOCUMENTS

| | | | |
|---|---|---|---|
| 3,466,430 | 9/1969 | Hardaway | 364/155 |
| 3,480,765 | 11/1969 | Rouxel et al. | 364/155 |
| 3,754,379 | 8/1973 | Bridges et al. | 55/112 X |
| 3,893,828 | 7/1975 | Archer | 55/112 X |
| 3,960,320 | 6/1976 | Slater | 364/153 X |
| 4,008,057 | 2/1977 | Gelfand et al. | 55/112 X |
| 4,195,699 | 4/1980 | Rogers et al. | 364/153 X |

OTHER PUBLICATIONS

Piller–"Data Entry Unit System Including a Hierarchy of Microcontrollers"–IBM Tech. Disc. Bull.–vol. 19, No. 3, Aug. 1976–pp. 1068, 1069.

Zimmerl–"Master–Slave Configurations with One–Chip Microprocessors"–Siemens Research and Development Reports–1978–pp. 322–324.

*Primary Examiner*—Joseph F. Ruggiero

*Attorney, Agent, or Firm*—Kenyon & Kenyon

[57] ABSTRACT

The optimum knock frequency of an electrofilter installation consisting of several filters is determined. Each filter includes a microcomputer controller and a knocking device. The knock frequency is controlled by a superimposed master computer and the optimum knock frequency for a given knock frequency, varying the frequency by the master computer, again measuring the long-term average of the dust loading, and continuing to change the frequency and measure the dust loading until the dust loading value reaches a minimum.

1 Claim, 2 Drawing Figures

METHOD FOR OPTIMIZING THE KNOCK FREQUENCY OF AN ELECTROFILTER SYSTEM

BACKGROUND OF THE INVENTION

The invention relates to a method for optimizing the knock frequency of an electrofilter installation.

The dust precipitated in an electrofilter system settles on the precipitation electrodes of the filter chambers and must be removed periodically by mechanical knocks. Up to four knocking mechanisms, for instance, are provided per filter chamber. If the interval between two knocks is too long, the filter efficiency is reduced due to the decreasing effective field strength. On the other hand, dust is stirred up by the knocks, so that, instantaneously, a higher residual dust content is produced.

OBJECTS AND SUMMARY OF THE INVENTION

It is an object of the present invention to optimize the knocking cycle. According to the invention, this problem is solved by automatically changing the time interval between the knocks in steps so that the long-term average of the measured dust loading of the purified gas approaches a minimum. In this manner, the knocking cycle for which the smallest amount of dust leaves the filter installation can be determined by means of a search procedure.

Further objects will become apparent after reading this disclosure, including the accompanying drawings.

In accordance with this invention a filter installation consisting of several filters includes a micro-computer as a controller for each filter and a common master computer, which is connected to a dust loading measuring device to receive dust loading information and connected to control all of the microcomputers. In addition to other functions, the master computer can then calculate the knocking cycle and coordinate the knocks of the individual filters. Specifically, it can provide that only one filter at a time is knocked, so that the precipitation effect of the other filters is always still maintained.

BRIEF DESCRIPTION OF THE DRAWINGS

In FIG. 1, a possible curve of the long-term average $S_m$ of the dust loading is plotted as a function of the knock frequency f. At a very low—virtually zero—knock frequency, i.e., no knocks at all, there is a relatively high dust loading of the purified gas. On the other hand, rapid—virtually continuous—knocking also causes a relatively high value of the dust loading. Between these two extremes the knock frequency that produces minimum dust loading must be found by a search procedure. To do so, one starts for instance, with a very low knock frequency $f_0$ and forms the long-term average of the dust loading over a certain extended period of time. After a given time, during which one operates with this knock frequency, the knock frequency is increased to the value $f_1$. According to the example assumed here, the value $f_1$ causes the long-term average of the dust loading to fall and so this procedure is continued until the minimum dust loading, which is obtained when a $f_x$ is reached. This minimum will be recognized by the fact that, upon further increasing the knock frequency to the value $f_{x+1}$, the long-term average $S_m$ of the dust loading increases. One will thus then return to the value $f_x$. If the frequency $f_1$ causes a higher dust loading than the initial frequency $f_0$, one can decrease the frequency to reach the same optimum valve $f_x$.

The method just described is applied continuously during the operation of the electrofilter installation so that a possible shift of the minimum can be recognized and taken into consideration.

Figure 2:
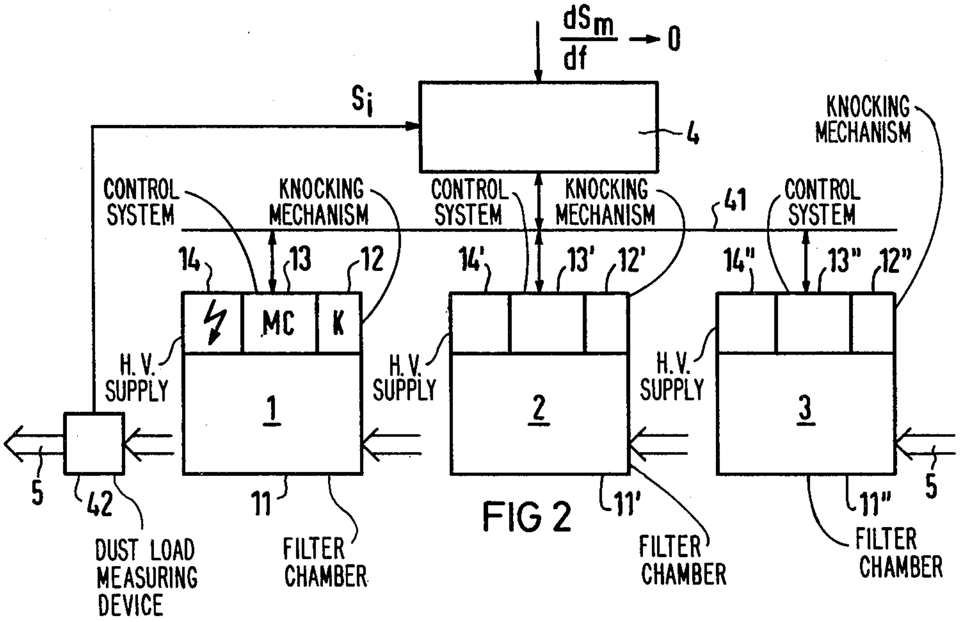
FIG. 2 is a schematic block diagram of a control device according to this invention and arranged to be used in an electrofilter installation.

The electrofilter installation shown in FIG. 2 includes three filters 1, 2 and 3 and a master computer 4. The gas to be purified flows through the filters in the direction of an arrow 5.

The electrofilter 1 consists of a filter chamber 11, one, or preferably more, knocking mechanisms 12, a regulation and control system 13 comprising a microcomputer, and a high voltage power supply 14. These components communicate via a bus 41 with the master computer 4 and obtain control commands from it. The dust loading Si occurring at the exit of the electrofilter installation is detected in a dust-loading measuring device 42 and is fed to the master computer 4.

Figure 1:
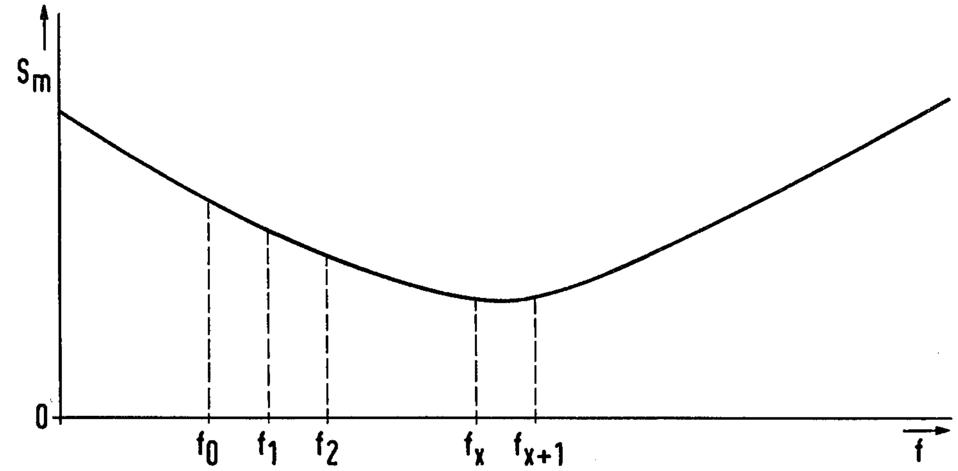
FIG. 1 is a graph showing the dependence of the long-term average of the dust loading of the purified gas as a function of the knock frequency.

In order to optimize the knocking cycle, the master computer 4 initially sets a first given knock frequency f for the knocking mechanism 12 and forms the long-term average $S_m$ of the dust loading. The master computer 4 then executes the search procedure described in connection with FIG. 1 and determines the optimum amount of knocking of the filter installation, at which $dS_m/df=0$.

The other electrofilters 2 and 3 consist of components 11'-14' and 11"-14", respectively, which are similar to the components 11-14 that make up the electrofilter 1. As a further task, the master computer 4 not only controls the operation of the electrofilters 2 and 3 in the same way as electrofilter 1 but coordinates the knocking of the individual electrofilters 1 to 3, so that always only one filter chamber 11, 11', or 11" is being knocked at a time.

What is claimed is:

1. A method for optimizing the knock frequency of an electrofilter installation having a plurality of electrofilters, for treating dust ladened gas to obtain a purified gas connected such that the gas to be purified flows through them in series, comprising the steps of:

- selecting an initial repetition rate of knocks for each of the filters;
- automatically controlling each of said electrofilters so that only one of the electrofilters is being knocked at a time;
- measuring the long term average of the measured dust loading of the purified gas from the electrofilter installation;
- changing the interval between knocks automatically; and
- repeating the measuring and changing steps until the long term average of the measured dust loading approaches a minimum.

* * * * *